J. W. STEWART.
WHEEL.
APPLICATION FILED DEC. 23, 1913.

1,110,156.

Patented Sept. 8, 1914.

Witnesses
R. M. Jones
E. R. Bunyea

Inventor
J. W. Stewart.
By J. Randolph Jr.
Attorney

UNITED STATES PATENT OFFICE.

JAMES W. STEWART, OF BARTONVILLE, ILLINOIS.

WHEEL.

1,110,156.  Specification of Letters Patent.  Patented Sept. 8, 1914.

Application filed December 23, 1913. Serial No. 808,344.

*To all whom it may concern:*

Be it known that I, JAMES W. STEWART, a citizen of the United States, residing at Bartonville, in the county of Peoria and State of Illinois, have invented certain new and useful Improvements in Wheels; and I do hereby declare the following to be a full, clear, and exact description of the invention, such as will enable others skilled in the art to which it appertains to make and use the same.

This invention relates to wheels, designed for use on vehicles of various kinds for travel on land, or for use on the water, and one of the principal objects of the invention is to provide a light, but strong and durable wheel for use on vehicles for both land and water, provided with air compartments to render the wheels buoyant, and to provide means for connecting a tire to the tread portion of the wheel.

Another object of the invention is to provide a buoyant wheel for auto vehicles, said wheel having a number of propeller vanes or blades connected thereto for propelling the vehicle over the water.

Figure 1:
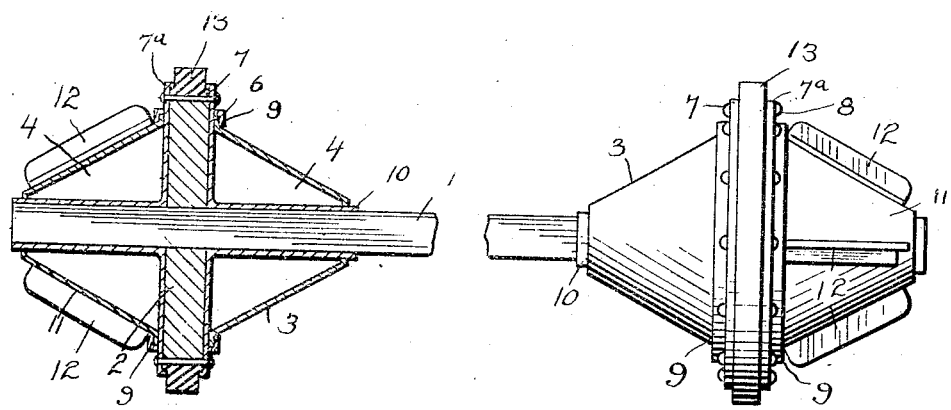
Figure 2:
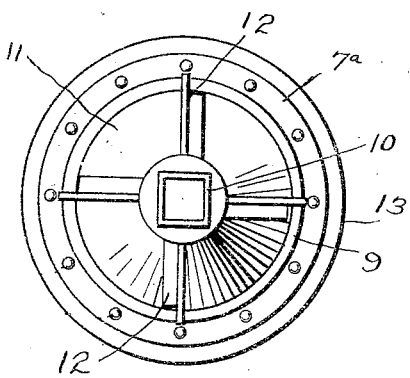

These and other objects may be attained by means of the construction illustrated in the accompanying drawing, in which, Figure 1 is a side elevation and sectional view of an axle broken away in the center and showing the wheel connected thereto, made in accordance with this invention, and Fig. 2 is an end view of one of the wheels.

Referring to the drawings, the numeral 1 designates an axle which is preferably square in cross section. The wheel is formed by means of a wooden or metal disk 2 having a central squared aperture through which the axle 1 extends. Connected to the inner side of the disk 2 is a frusto-conical hollow metal buoyant air container 3, which is provided with an air tight chamber 4. The air container 3 is provided with a peripheral angularly extending flange 6. A securing ring 7 provided with an offset portion 9 is secured so that its offset portion overlies the flange 6 and holds the parts in place. Extending through the disk 2 and forming the inner wall of the air chamber 4 are tubular axle bearing portions 10 which are preferably rectangular in cross section so that the axle will fit closely therein.

Secured to the outer or opposite sides of each of the disks 2 is a buoyant air container 11, made in all essential particulars like the container 3, but provided however, upon its outer surface with a plurality of propeller vanes 12. This buoyant container is also secured to the disk 2 by means of a ring 7ª through which the bolts 8 pass to assist in holding the container in place on the disk. The annular rings 7 and 7ª are spaced apart and secured between them is a rubber tire 13 of any suitable form or construction.

From the foregoing it will be obvious that a wheel made in accordance with this invention may be used on a vehicle for traveling on land or for propelling the vehicle over the water, and that the construction is strong and durable, and that the device will operate efficiently under the various conditions met with.

What is claimed is:—

1. A buoyant wheel comprising a disk, frusto-conical air tight containers on opposite sides of said disk, propeller vanes on one of said containers, rings for securing the containers in place on opposite sides of the disk and a tire secured between said rings.

2. A buoyant propeller wheel for auto-vehicles comprising a rectangular tubular bearing through which the axle is designed to extend, a disk mounted on said axle, frusto-conical air containing elements, secured one at each side of said disk, said containers having propeller vanes connected thereto, rings secured on opposite sides of said disk for holding the air containers in place, and a tire disposed between said rings.

In testimony whereof I affix my signature in presence of two witnesses.

JAMES W. STEWART.

Witnesses:
CLAUD HARKINS,
GEORGE SCHRAUB.

Copies of this patent may be obtained for five cents each, by addressing the "Commissioner of Patents, Washington, D. C."